G. Stackpole,

Bit Stock.

No. 3,005. Reissued June 23, 1868.

Witnesses:
Gustavus Dieterich
Edwin F. Reed

Inventor:
Greenleaf Stackpole
by
Mason, Fenwick & Lawrence
Attys

N. PETERS, PHOTO-LITHOGRAPHER, WASHINGTON, D. C.

UNITED STATES PATENT OFFICE.

G. STACKPOLE, OF NEW YORK, N. Y., ASSIGNOR TO G. STACKPOLE, OF SAME PLACE, AND J. N. WINSLON, OF PORTLAND, MAINE.

IMPROVEMENT IN BIT-BRACES.

Specification forming part of Letters Patent No. 36,538, dated September 23, 1862; Reissue No. 3,005, dated June 23, 1868.

*To all whom it may concern:*

Be it known that I, GREENLEAF STACKPOLE, of New York city, State of New York, formerly of Portland, county of Cumberland, and State of Maine, have invented a new and useful Improvement in Bit-Braces; and I do hereby declare the following to be a full and exact description thereof.

My invention consists, first, in the combination of a divided socket, a contracted neck or outer end of the socket, and a movable ring to confine the divided parts together; and, second, in the employment of certain bearing-surfaces within the socket of much less area than the entire interior of the socket to form bearings for the bit held therein.

I will first describe what I consider the best means of carrying out my invention, and will afterward designate the points which I believe to be new.

The accompanying drawings and the letters of reference marked thereon form a part of this specification.

Figure 1:
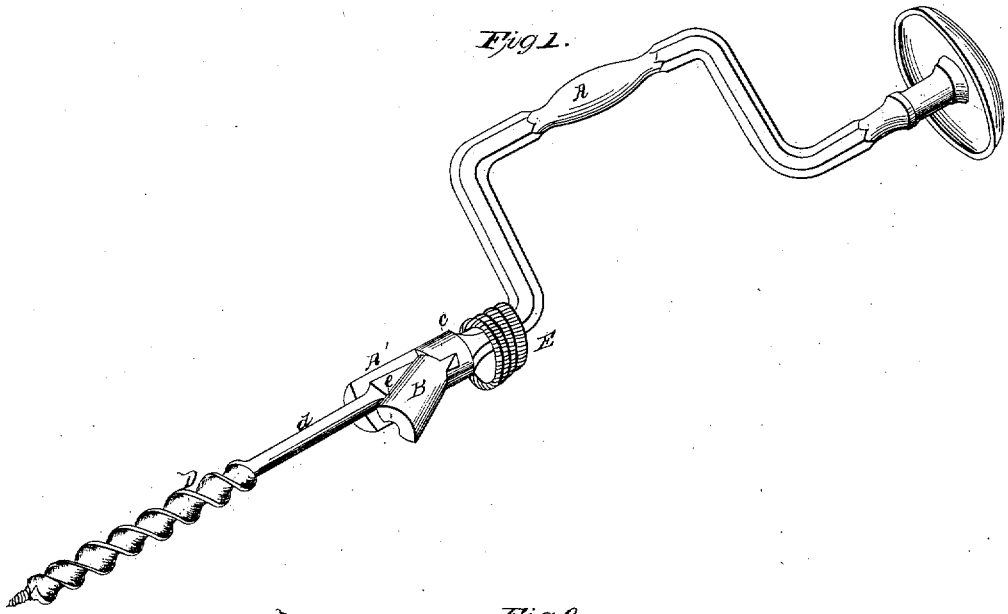
Figure 2:
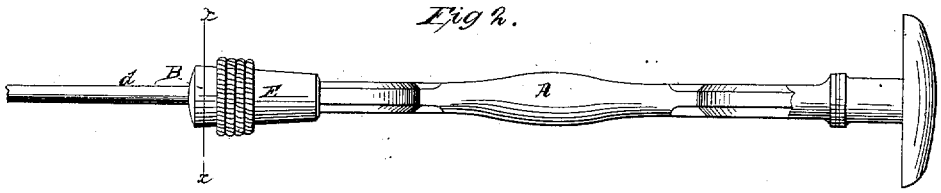
Figure 3:
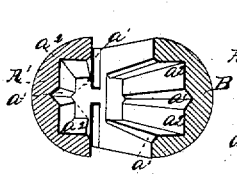
Figure 4:
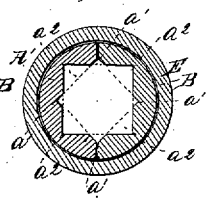
Figure 5:
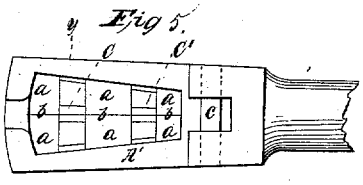

Figure 1 is a perspective view of my improved bit-brace, represented as partially open to allow the removal or exchange of the bit. Fig. 2 is a side view of the same, represented as closed and tightly secured around to firmly confine the bit. Fig. 3 is an end view with the jaw open, the interior being in this figure without the tang-bearings shown in Fig. 5, and without the contracted neck, both of which I esteem important. Fig. 4 is a cross-section in line *x x*, Fig. 2; and Fig. 5 is a side view with the jaw of the bit-brace removed so as to expose the interior.

Like letters in the several figures indicate the same or analogous parts.

I so form the socket of my bit-brace that its jaws grip the bit with a solid bearing upon every side of the tang of the bit, both at the starting point of the tang as well as at or near its termination, thus giving the bit a firm and steady bearing in the brace.

The body of the brace A is made in the usual manner and in the approved form, as shown in Figs. 1 and 2. Its outer end, as at A′, (see Fig. 5,) is constructed to form a continuation of the main portion of the implement, and is forged into a half-socket, *b*, for the reception of the shank or tang of the bit to be used in connection therewith, the fellow half-socket *b* being framed in the jaw B, said jaw being so formed at one extremity as to be hinged to and articulate upon the pin *c*.

Referring to Fig. 5, the socket formed by the part A′ and the jaw B is spaced off by tang-bearings C C′, which swell inward from the walls of the socket. These bearings have V-shaped grooves $a'$ $a^2$ cut in them, as indicated, said grooves tapering in conformity with the taper of the shank or tang of the bit which they are intended to grip. These bearings C and C′ are distinct from each other, as shown in Fig. 5. The tapered grooves $a'$ and $a^2$ permit of the insertion in the socket *b* of bits having shanks of different sizes. A shank which would be clasped by the tapering grooves $a'$ would be of less size or diameter than a shank of a size to be gripped by the grooves $a^2$.

In Fig. 3 I have shown a socket without the distinct and separate bearings C C′, the angular grooves $a'$ $a^2$ being adapted, as in the other form, to receive two sizes of bit-shanks, but these grooves being formed or cut in the body of the metal composing the parts A′ and B.

The form of the socket illustrated by Fig. 5 is, however, preferable to that shown in Fig. 3, for the reason that it allows of easier alteration when required. It will be readily seen that although the bit-brace may have been in the first instance formed for bits with shanks of only two given sizes, yet the grooves which are adapted to receive the smaller size may very readily be enlarged, if occasion require, so as to fit any given size intermediate between the original sizes of shanks which the stock was adapted to receive. This enlargement of the lesser grooves $a'$ may be effected by simply deepening them in the bearings C and C′ by any ordinary means—as, for example, cutting with a small chisel, the depth of the cut required being such as to permit accurate work.

E is a metal ring with its interior surface conical, to fit upon the parts A′ and B when closed, as shown in Fig. 2, and thus hold the bit D firmly in place within the socket. When the socket A′ B is closed, as shown in the last-named figure, the bit D can be removed by turning the ring with a downward pressure until it drops into the position shown in Fig. 1, whereupon the jaw B may be thrown into the open position shown by a lateral pressure of the bit against the jaw.

It will be observed that the outer end of the socket is contracted, forming a small neck adapted to retain the enlarged tang of the bit very firmly and allow it to be pulled with great force whenever it sticks in the wood from any cause. This I consider a very essential feature in all bit-braces of this class.

Having thus described my invention, what I claim as new, and desire to secure by Letters Patent of the United States, is—

1. In combination with a divided bit-shank socket, having a contracted neck, the ring E for holding the bearings upon the shank of the bit, constructed and operating substantially as set forth.

2. The bearings C C′, having grooves $a'$ $a^2$ therein to admit different-sized bit-shanks without an enlargement of the grooves to the extent of the whole length of the socket or the bit-shank, substantially as specified.

G. STACKPOLE.

Witnesses:
C. C. LIVINGS,
W. C. DEY.